No. 659,117. Patented Oct. 2, 1900.
S. P. WHITE & J. C. MILLER.
PORTABLE STOCK INCLOSURE.
(Application filed July 17, 1900.)

(No Model.) 2 Sheets—Sheet 1.

Fig. 1.

Witnesses.
Robert Everett.

Inventors,
Stephen P. White.
Jacob C. Miller.
By
James L. Norris.
Atty.

No. 659,117. Patented Oct. 2, 1900.
S. P. WHITE & J. C. MILLER.
PORTABLE STOCK INCLOSURE.
(Application filed July 17, 1900.)
(No Model.) 2 Sheets—Sheet 2.
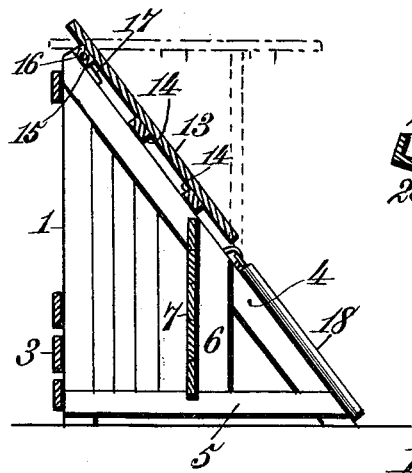
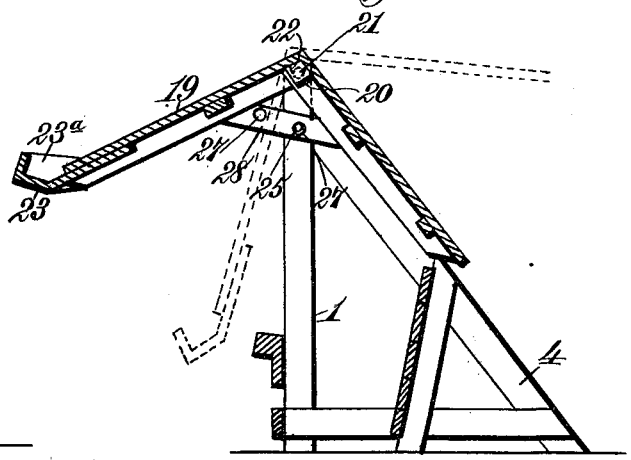
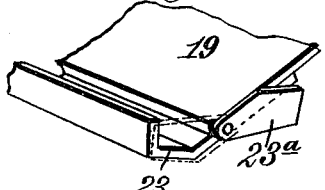
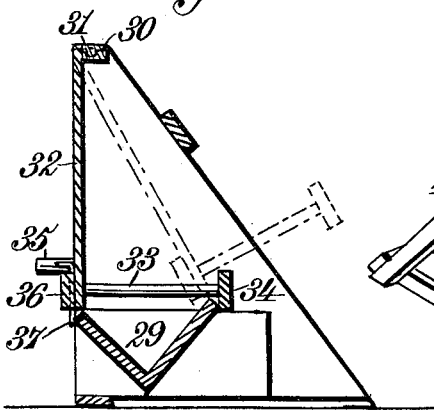
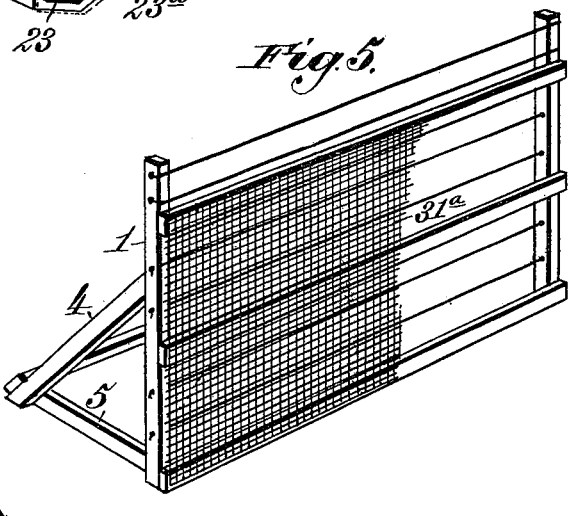

UNITED STATES PATENT OFFICE.

STEPHEN P. WHITE AND JACOB C. MILLER, OF PULASKI, TENNESSEE.

PORTABLE STOCK-INCLOSURE.

SPECIFICATION forming part of Letters Patent No. 659,117, dated October 2, 1900.

Application filed July 17, 1900. Serial No. 23,953. (No model.)

*To all whom it may concern:*

Be it known that we, STEPHEN P. WHITE and JACOB C. MILLER, citizens of the United States, residing at Pulaski, in the county of Giles and State of Tennessee, have invented new and useful Improvements in Portable Stock-Inclosures, of which the following is a specification.

Our invention relates to portable stock-inclosures, our object being to provide a light compact structure formed in portable sections capable of being transported to any part of a farm and there arranged to inclose a suitable area without setting posts in the earth, the sections being so constructed as to adapt them, one or more, to be used as feed-racks, wind-breaks, and shelters for stock.

It is our purpose to provide a structure of the kind referred to, any one or more of the portable sections thereof being capable of serving as feed-racks, which can be supplied from the outside, thereby enabling the stock-feeder or care-taker to avoid the filth of the inclosure, as well as the possibility of attack by vicious animals. We aim also to provide such an inclosure with a shelter or wind-break capable of being used as a salt-trough, so formed as to be removable when the inclosure is to be taken to another spot in order to lighten the structure and facilitate its handling.

Our invention also comprises other novel and useful features, all of which will be fully described in the course of the following specification and then particularly pointed out and defined in the claims at the end of the same.

For the purposes of the following description reference is had to the accompanying drawings, in which—

Figure 1 is a perspective view showing our invention. Fig. 2 is a vertical section showing the application thereto of our shelter or wind-break. Fig. 3 is a vertical section showing a removable roof-shelter and wind-break capable of use in feeding salt to stock. Fig. 4 is a similar section showing a part of an inclosure adapted for pigs. Fig. 5 is a detail view showing a single section adapted to be used as part of a poultry-yard inclosure. Fig. 6 is a detail view showing a feature of the detachable roof-section.

The reference-numeral 1 in said drawings indicates the front posts of a portable section, which are connected together and to a central front post 2 by means of horizontal strips 3, attached at short intervals, the upper strip being at or near the middle of said posts. These posts are supported by inclined bracing-posts 4 on the outside, connected at their lower ends to the ends of the posts 1 by horizontal strips 5. At or near the central parts of the latter are short uprights 6, which meet the lower faces of the inclined bracing-posts 4. Horizontal strips 7, screwed to said uprights, form in each section a manger, inclosed between said strips and the strips 3. A hinged cover is provided for the manger by light parallel strips 8, connected by transverse pieces 9, said cover being connected to the inclined braces by any suitable form of hinges 10, secured to the ends of the lower strip. By turning this lid back the hay or other feed can be placed in the manger without entering the inclosure, and by throwing the lid up over the top of the manger the latter will be securely protected against outside animals. Stanchions 12 may be used, if necessary, to prevent the cattle or other animals feeding at the manger from encroachments upon each other. One or more of said sections may be provided with the form of wind-break shown in Fig. 2, which consists of a light boarding 13, secured to cleats 14 and provided with a bar 15, having end pintles 16, adapted to engage bearings 17 at the upper ends of the front posts 1. The boarding may be turned down over the manger, and when food is supplied to the latter it is raised and sustained by a prop 18, having one end connected to one of the inclined brace-posts 4.

We may also use the construction shown in Fig. 3, composed of a light detachable roof 19, provided with a bar 20, which lies in the angle beneath the apex of the roof, its ends having pintles 21, adapted to rest in open bearings or notches 22 in the upper ends of the front and central posts. One portion of this roof covers the manger, and the other portion, which extends over the inclosed area, is wider than the other and is provided with a marginal trough 23, which will carry off water during rain-storms. This structure not only acts as a wind-break, but shelters the stock, and can be used in feeding salt, the latter being placed in the trough 23 and the roof being tilted or turned so as to bring the trough within reach of the stock. Salt may also be fed from a box 24, placed across one end of the manger. At the ends of the trough 23 are transverse pieces 23ª, as shown in Fig. 6, which are pivoted to the ends of the roof in such manner that they can be turned back, leaving the ends of the trough 23 open, so that the water shed from the roof can escape. When the trough is used to feed salt to stock, the pieces 23ª are turned in the opposite direction to lie across the ends of the trough, where they prevent the salt from escaping and being wasted. The detachable roof 19 can be held in either of the two positions shown in Fig. 3 or in any other position by inserting a pin 25 in a hole in one of the posts 1, said pin also engaging an aperture 27 in the collar-beam 28, which supports the roof, two or more such apertures being formed in this beam at such points as to suit the different positions in which the roof is to be used. This pin 25 also serves to fasten the roof rigidly in its place and prevent it from being blown off or changed. If preferred, one of the two transverse pieces 23ª can be a rigid part of the roof, so that one end of the trough 23 will be permanently closed, the water received from the roof being discharged from the other end of said trough.

The inclosure is "pig-tight" or proof against the entrance or escape of pigs, and means for feeding these animals may be provided by substituting a trough 25 in place of the manger, the strips 3 being removed and the back of the section closely boarded up. To prevent the stronger animals from depriving the weaker or smaller of their food, the trough is provided with a series of short transverse bars 26, set in a longitudinal bar 27 and placed over the top of the trough.

One or more of the several sections forming the inclosure may be reversed or turned around, so that the inclined bracing-posts 4 will be on the inside of the inclosure. Such reversed section is provided with a trough 29 for feeding pigs. This trough can occupy the space provided in other figures for the manger, the strips 3 and 7 being removed, and to enable the pigs to be fed and the trough to be cleaned without entering the inclosure and without the necessity of removing or disturbing the trough we provide the following means.

In suitable bearings 30 upon the posts 1 we mount a rock-bar 31, from which hangs a panel 32, the lower edge thereof being just above the outer or rearward edge of the trough. Rigidly secured to said panel, along the lower edge of the same, are a number of division-bars 33, which extend over the top of the trough at suitable intervals, their inner ends being set in a strong bar or beam 34, which lies just over the inner or front edge of the trough 29. The panel 32 can easily be swung inward by a person standing outside the inclosure until its lower edge is above the inner or front edge of the trough, and the latter can then be filled or cleaned, the pigs meantime being wholly prevented from getting at the trough. By releasing the panel it swings back to place by its own gravity, with the division-bars 33 across its top, by which the animals are separated from one another in feeding. The bar 34 projects below the division-bars far enough to engage the inner edge of the trough when the panel swings by gravity back to its normal position. A projecting pin 35 may be provided on the outer side of the panel, on which the foot can be placed to swing the panel inward, so that the person supplying food to the trough can have the use of both hands. The ends of the bars 33, secured to the panel 32, extend through the latter and into a stiff strip 36 on the outside. A fastening 37 may be slipped into an opening between the panel and said strip, its end dropping below the edge of the trough to prevent inward displacement of the panel.

The several sections of the inclosure are connected together by eyes 28ª and hooks 29ª, and the structure when once set up has great strength and is capable of resisting any stress, although no posts are set in the earth. Entrance and exit are afforded by two gate-sections 30ª, detachably hinged to the ends of two adjacent sections.

A movable poultry-yard may be provided by merely omitting the parts forming the manger and attaching a wire screen 31ª or other suitable material to the front posts 1.

Having thus described our invention, what we claim, and desire to secure by Letters Patent of the United States, is—

1. A portable stock-inclosure, composed of a series of separate sections, each consisting of vertical front posts, horizontal strips connected to the lower part of said posts, inclined bracing-posts, transverse strips connecting the inclined to the vertical posts, uprights between said transverse strips and inclined posts, horizontal strips connected to said uprights to form a manger, and a hinged lid for said manger, substantially as described.

2. A portable stock-inclosure, consisting of a series of connected sections having vertical front posts, short uprights and inclined bracing-posts with mangers formed between the front posts and short uprights, and coverings for said manger hinged to the inclined bracing-posts, whereby the mangers can be supplied from the outside, substantially as described.

3. In a portable stock-inclosure, formed of separate connected sections, each formed of vertical front posts and inclined bracing-posts, a removable and attachable windbreak consisting of a boarding having pintles at its ends near one edge, bearings on the upper ends of the posts to receive said pintles and enable the boarding to cover the upper part of the inclined, outer part of said section, and means for holding the wind-break projected, substantially as described.

4. In a portable stock-inclosure consisting of separable connected sections, a wind-break and shelter consisting of a roofing having pintles at its ends in line with the apex of the roof, the wider, inner side of said roof being provided with a trough adapted to carry off water flowing from the roof, or to be used in feeding salt to stock, and means for holding the wind-break projected, substantially as described.

5. In a portable stock-inclosure, a detachable roof-section having end pintles adapted to lie in bearings in the upper ends of the posts, said roof having a trough along one edge, the ends of the trough being provided with transverse pieces pivotally attached and capable of being turned across the open ends of said trough, or thrown back to permit the escape from said trough of water shed from the roof, and means for holding said roof projected, substantially as described.

6. A portable stock-inclosure, consisting of a series of separable connected sections, one of said sections provided with a trough and each of the remaining sections with a manger and consisting of vertical front posts, horizontal strips connected to the lower part of said posts, inclined bracing-posts, transverse strips connecting the inclined to the vertical posts, uprights between said transverse strips and inclined posts, horizontal strips connected to said uprights to form a manger, and a hinged lid for said manger, substantially as herein described.

In testimony whereof we have hereunto set our hands in presence of two subscribing witnesses.

STEPHEN P. WHITE.
JACOB C. MILLER.

Witnesses:
R. G. PATTON,
DAN W. PATTON.